United States Patent
Paparoni

[11] Patent Number: 6,092,435
[45] Date of Patent: Jul. 25, 2000

[54] OUTSIDE CONTROL OF AUTOMOBILE GEAR BOX WITH INHIBITOR OF INVOLUNTARY GEARING OF THE REVERSE GEAR

[76] Inventor: Paolo Paparoni, Rua Salvador Cardoso, No. 112-5°, Andar, São Paulo, S.P., Brazil

[21] Appl. No.: 09/133,500

[22] Filed: Aug. 12, 1998

[30] Foreign Application Priority Data

Aug. 13, 1997 [BR] Brazil ..................................... 9702671

[51] Int. Cl.⁷ .................................................. B60K 20/00
[52] U.S. Cl. .................................... 74/473.25; 74/473.21; 74/473.22
[58] Field of Search ........................... 74/473.21, 473.22, 74/473.25; 403/106, 107, 108

[56] References Cited

U.S. PATENT DOCUMENTS

| | | | |
|---|---|---|---|
| 3,648,536 | 3/1972 | Maina | 74/473.22 |
| 3,745,853 | 7/1973 | Deibel et al. | 74/586 |
| 3,974,711 | 8/1976 | Hurst, Jr. et al. | 74/473.22 |
| 4,181,293 | 1/1980 | Laribee | 403/108 X |
| 4,541,300 | 9/1985 | Kwiatkowski et al. | 74/473.21 |
| 4,693,135 | 9/1987 | LaRocca et al. | 74/473.21 |
| 4,914,969 | 4/1990 | Lieb | 74/473.23 |
| 5,271,305 | 12/1993 | Peters et al. | 403/107 X |
| 5,345,973 | 9/1994 | Vinciguerra | 403/106 X |
| 5,566,581 | 10/1996 | Smale et al. | 74/473.22 |
| 5,586,811 | 12/1996 | Tornero | 403/108 X |
| 5,651,290 | 7/1997 | Osborn et al. | 74/473.22 |
| 5,687,814 | 11/1997 | Craig et al. | 403/107 X |
| 5,781,945 | 7/1998 | Scherer et al. | 403/106 X |
| 5,839,326 | 11/1998 | Song | 403/107 X |

*Primary Examiner*—David A. Bucci
*Assistant Examiner*—Brandon C. Stallman
*Attorney, Agent, or Firm*—James Ray & Associates

[57] ABSTRACT

Outside control of an automobile transmission having an inhibitor to prevent involuntary shifting into reverse gear including a gear changing lever (1) connected through rods or cables (12) to the gear box, a locking bar (2) axially slidable on lever (1) having a stop and inhibitor lock (5) to prevent engagement of the reverse gear if the inhibitor lock is not intentionally lifted, and when the bar (2) is slidably lifted on lever (2), stop bar (2) will pass over inhibitor lock (5), including a locking bar (23) which slides axially on the control lever (1), with said locking bar (2) having as stop an inhibitor lock (5) which does not allow the engagement of the reverse gear when the locking bar (2) is not intentionally raised and when raised clears the inhibitor lock (5) in order to allow the engagement of said gear, characterized by the fact that said inhibitor lock (5) is solidary with the movable base (8) which is supported on the fixed base (9), with said bases having means to move and lock the first base on the second, in such a way to allow the adjustment of the position of said inhibitor lock (5) in the longitudinal and transversa direction and the fixing of the position so established, in such a way to allow that the adjustment be made within the cabin of the vehicle.

2 Claims, 4 Drawing Sheets

OUTSIDE CONTROL OF AUTOMOBILE GEAR BOX WITH INHIBITOR OF INVOLUNTARY GEARING OF THE REVERSE GEAR

FIELD OF INVENTION

This present invention is related to an outside command system for an automotive gear box, which does not allow the driver to gear, involuntarily, the reverse gear, using for such a purpose a movement locking system of the gear lever, corresponding to the reverse gear position, specifically a system in which the locks for the reverse gear is located in a movable base plate, the position of which may be adapted with said regulation being made at the base of the gear box lever within the cabin of the vehicle.

DESCRIPTION OF THE ART

As fully known, the outside control system for an automobile gear box is constituted by a gear lever, located at the reach of the driver's hand and connected through cables or bars to the gear box, or more specifically, to the retransmission system of said gear box, constituted by the set of arms, joints and forks which locate and couple the gears in the gear box, in order to establish the transmission rates which were selected by the driver through the command lever.

In order to allow the selection of the several relationships for transmission with one single command lever, the lever is pivoted through a sphere which allows angular movements in several directions, with the transverse movements being normally used to select the position of the gears and the longitudinal movements used to couple the selected gears.

The outside gear control is a set formed by the lever, the pivot and the bars or cables which transmit to the gear box the movements for the selection of the gear by the command lever.

The use of the gear box, especially in acceleration deceleration or emergency maneuvers of the vehicle, require speed, precision and safety as all expert drivers know, and it may cause serious problems if the mechanical systems show any difficulties upon selecting or changing gears. The problem is especially serious in the case of reverse gear, for if the vehicle is running at a given speed and the driver, upon changing the gears, connects involuntarily the reverse gear, the gears of the gear box may burst, with serious consequences for the vehicle and for the passengers.

Due to such a reason, in most vehicles the reverse gear is protected by some type of outside inhibitor in the control lever, which forces the driver to open the locking system in order to connect the reverse gear independently of the internal inhibitor at the gear box present in most vehicles which inhibits the movement from the higher gear into the reverse gear.

The introduction of the inhibitor of the reverse gear brought another problem: the need to assure that the locking system of the inhibitor does not lock or make it difficult to the coupling of the other gears. In order to avoid this, the lock shall be located in a precise position relative to the selection position and to the coupling of the other gears in such a way to allow a perfect definition of the position of the reverse gear and not to interfere with the freedom of movements of the lever in the operation for selection and coupling of the forward gears.

At the gear box, the position relative to the gears for each movement is defined by the retransmission system of said box. The summation of the existing box plays amongst the positions of the gears within the box and the corresponding positions of the control lever, including the plays of the movement transmission elements, which results in a quite wide variation in the position of the lever which, in the case of the inhibitor for the reverse gear, may cause the undetermination or failure of the engagement of said gear and difficulty to engage the other gears.

In order to adjust the position of the lever in such a way to have a correspondence between the position of engaging the gears and the position for locking the inhibitor the of with reverse gear, it is normally used within the control of the bars or cables with regulated length. Besides the fact that said adjusted elements are more expensive, this type of regulation presents difficulties because it should be made, normally at the gear box which specially in the modern vehicles with transverse engines, is not of easy access with the regulation being quite complex, time consuming and not precise. difficulty appears both in the traditional control bars, with cables and of the hybrid type, with bar and cable of the push-pull type.

SUMMARY OF THE INVENTION

There is, therefore, the need to develop an inhibitor to prevent of involuntary engaging of the reverse gear which allows the regulation of the position of said lock directly within the cabin of the vehicle, on the base of the lever in a faster and more precise adjustment.

The solution, submitted hereby, is a device which inhibits the engaging of the reverse gear, formed by a locking bar placed axially on the exchange control lever, the stop of which, in the longitudinal and transversal direction, is constituted by a inhibitor lock solidary within the movable base located on the fixed base where the lever is joined, and with means for the locking of the first one in respect to the second one, in such a way that the inhibiting lock may be adjusted in the longitudinal and transverse direction and fixed in the best position for the operation of the inhibitor of the reverse gear, and that said adjustment may be made directly inside the cabin, removing only the flexible cover from the gear exchange control, therefore, simplifying and accelerating the regulation operation of the position of the lock.

Considering that most vehicles which use inhibitor systems to allow the unlocking thereof, said locking bar is solidary to a coaxial pipe with the control lever, which when operated by the driver moves vertically in order to surpass the inhibitor lock and allows the engagement of the reverse gear.

DESCRIPTION OF THE DRAWINGS

The characteristics, purposes and advantages of the device submitted in this invention become clear through the detailed description of the drawings in the preferred configuration, submitted attached hereto, as a non limitative example, where:

With a more specific reference, to the drawings, FIG. 1 shows the gear control set with the inhibitor of involuntary engagement of the reverse gear, object of this invention, which is constituted by a gear lever 1, on which the locking bar 2 is assembled, in an axially sliding way, solidary with the coaxial driving pie 4 with the rod 3 of the lever 1, and of a lock 5 which in its face 6 is the stop of the locking bar 2 for longitudinal movements of the lever 1 and in its face 7 is the stop for the transverse movements of the same lever with the face 6 of the lock 5 constituting the inhibitor stop of the reverse gear, and the face 7, in the corner formed with face 6, limits and locates the selection plan of the lever 1 for the engagement of the reverse gear.

Figure 1A:
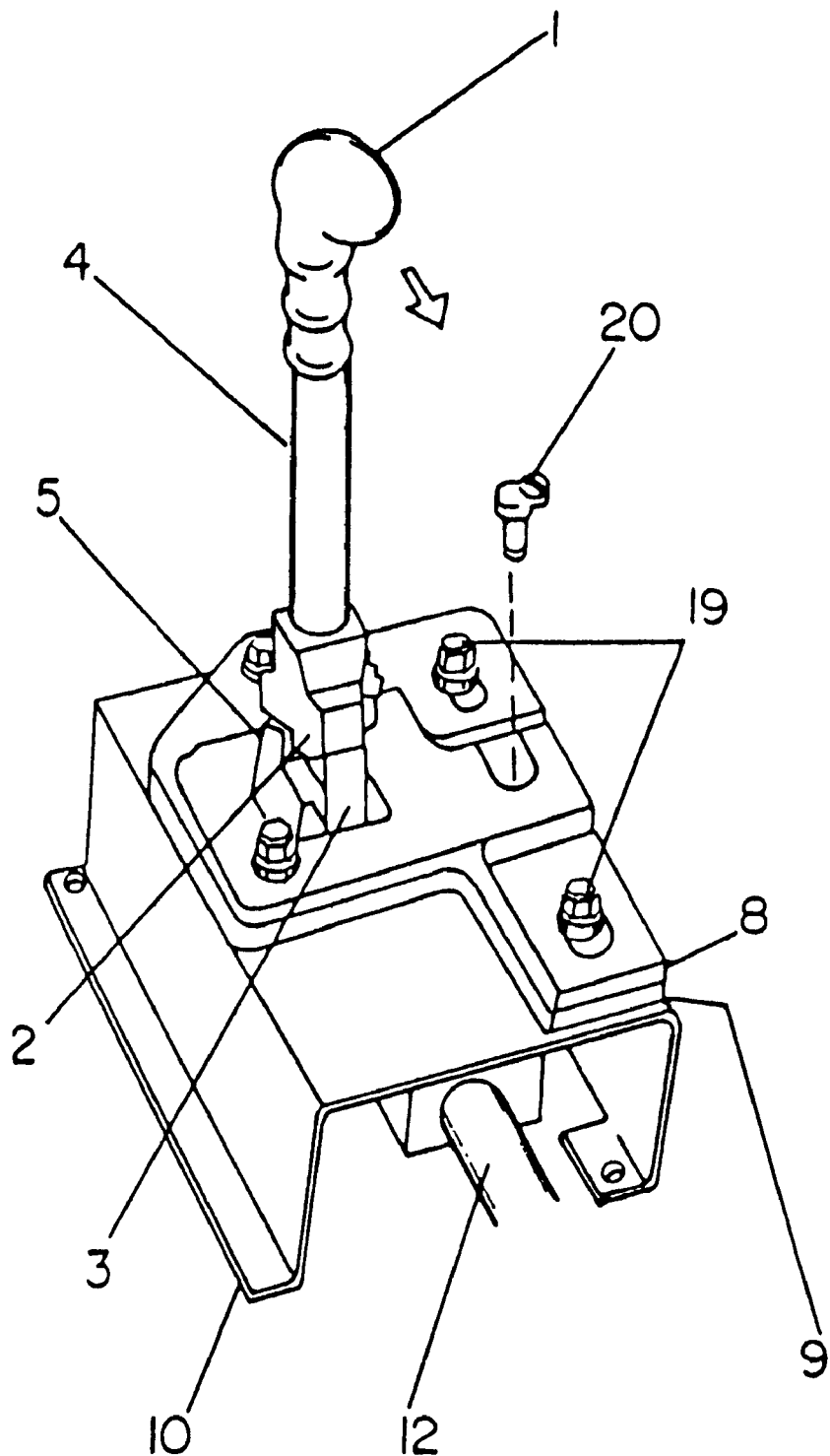
FIG. 1 is a perspective view of part of the outside gear control set with the reverse gear inhibitor device object of the invention, describing the movements of a control lever for a five forward and one reverse speed gear box, with the reverse gear located in the same level of the fifth gear.

The lock 5 is solidary with the movable base 8, which seats on the fixed base 9 which, on its turn is fixed on the support 10 of the gear control. In the configuration submitted, between the fixed base 9 and the support 10 there is the pivot 11 of the control lever 1. The movements of the lever are transmitted to the gear box through the system of transmission bars or cables 12.

Figure 1B:
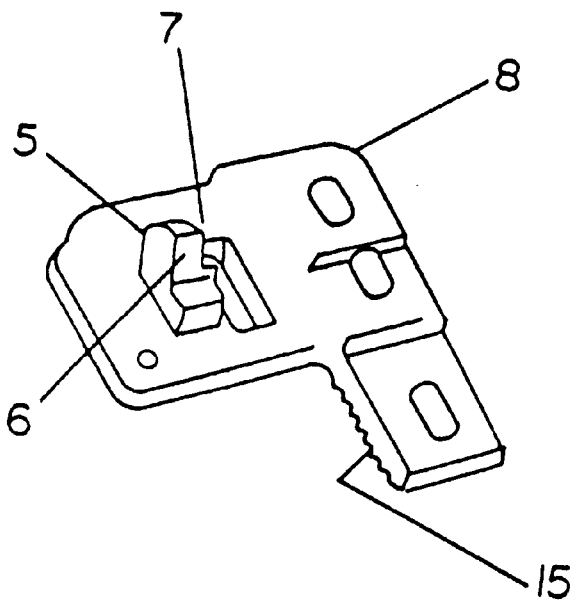
Figure 1C:
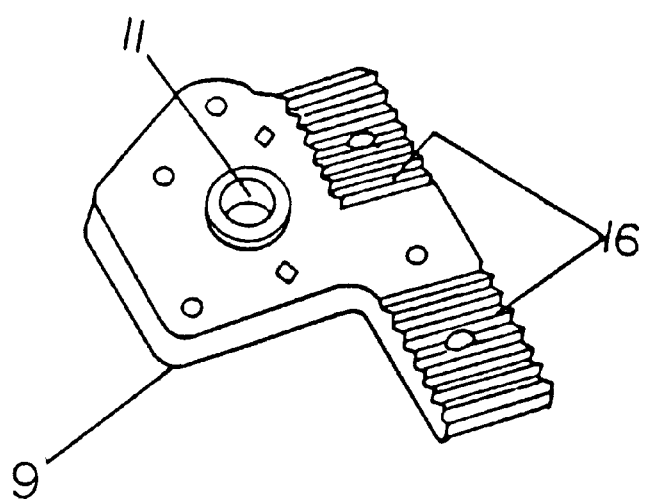

The arrow shown in FIG. 1 indicates the direction of the longitudinal axis of the vehicle and is turned towards the front side of the vehicle.

Figure 2:
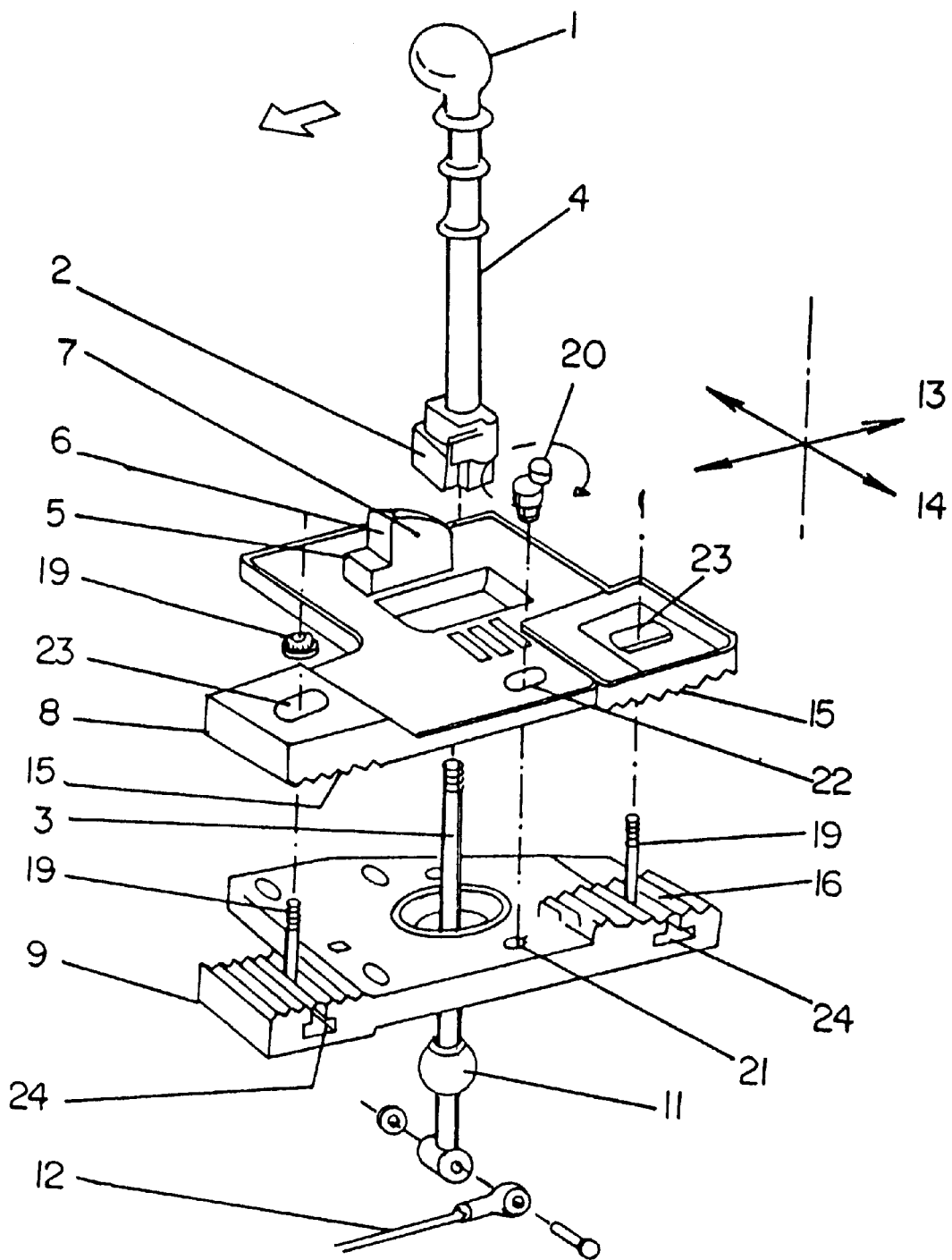
FIG. 2 is an exploded view of the same set of FIG. 1, showing the adjustment and fixation means of the movable and fixed bases.

The regulation and fixing means for the position of the inhibitor lock 5 in the longitudinal direction 13 and transversal direction 14 are shown in FIGS. 1 and 2, which show that below the movable base 8 that it is solidary with the lock 5, there is a serrated portion 15 divided into two portions which correspond to the two portions of the serrated portion 16 above the fixed base 9.

The fixing of the two serrated portions allow the movable base 8 to have transversal 14 movements of variable lengths, and longitudinal movements 13 in discreet pitches with a space from tooth to tooth sufficient to regulate the inhibition point.

The inhibitor lock 5 is specially subject to shocks of the lever 1 in the longitudinal 13 direction. In the configuration shown, and in a non-limitative way for this invention, in order to assure the unchangeability of the position of said lock the serrated portions 15 and 16 were used. In this type of construction, the teeth are perpendicular to the direction of greater stress caused by the impacts of the lever 1 in the engagement direction, and as a consequence they do not transmit any impact caused by the movement of said lever to the fixation means 19, avoiding the possibility of sliding between the movable base 8 and the fixed base 9.

We should notice that as for the transversal direction, the impact provoked by the control lever 1 through the locking bar 2 against the lock 5 is given by the elasticity of the transmission system once the amplitude of the selection movement is limited by the stops existing in the gear box.

The regulation of the inhibitor lock 5 is made releasing the fixing means 19, namely, in the figures the bolts and nuts which fix the movable base 8 to the fixed base 9, and then raising the movable base 8 the sufficient to clear the opposite teeth edges in order to position it in the longitudinal direction. Transversely, the positioning is achieved by sliding from one side to the other, the movable base 8 over the fixed base 9. Finally, once the two positions are shown, the fixing elements are firmly tightened 19.

In the configuration shown in the attached drawings, and in a non-limitative way, for the fine adjustment of the transverse position of the lock 5a regulating pin 20 is used with eccentric head, which, upon being regulated with an appropriate tool, it turns the hole 21 of the fixed base 9 while its eccentric head moves within the oblong hole 22 of the movable base 8, displacing it cross-wise with the inhibitor lock 5. Due to the irreversibility of rotation, the regulating pin 20 constitutes, also a block against the accidental transverse movement of the movable base 8 after the regulation.

During the regulation, the fixing means 19, in the case shown in figures constituted by two bolts with nuts, follow the movements of the movable base 8 sliding in the oblong holes 23 made in said base, and in the "T"shaped openings 24 made in the transverse direction on the fixed base 9, in such a way that the bolts slide within the openings with their heads connected in the vertical direction. Once the correct position of the inhibitor lock 5 is located, the two bases may be fixed one to the other in the above defined position.

Figure 3:
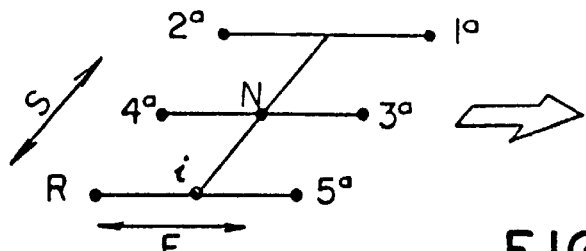
FIG. 3 is a diagram of the movements of control lever of FIG. 1, for the selection and engagement of the five forwards and one reverse gears.

The operation for the selection and engagement of the gears is performed by the driver using the control lever 1 following the diagram of the movements which, in the case of the example shown, is represented in FIG. 3. Lever 1, which when not operated remain the neutral position N, is moved in the transversal direction in the selection plan S to reach one of the three longitudinal plans of engagement E, namely, the plans: $1^{st}$-$2^{nd}$; $3^{rd}$-$4^{th}$; $5^{th}$-R, and engage one of the six gears shown in FIG. 3. The arrow in this figure indicates the direction of the movement of the vehicle.

Figure 4:
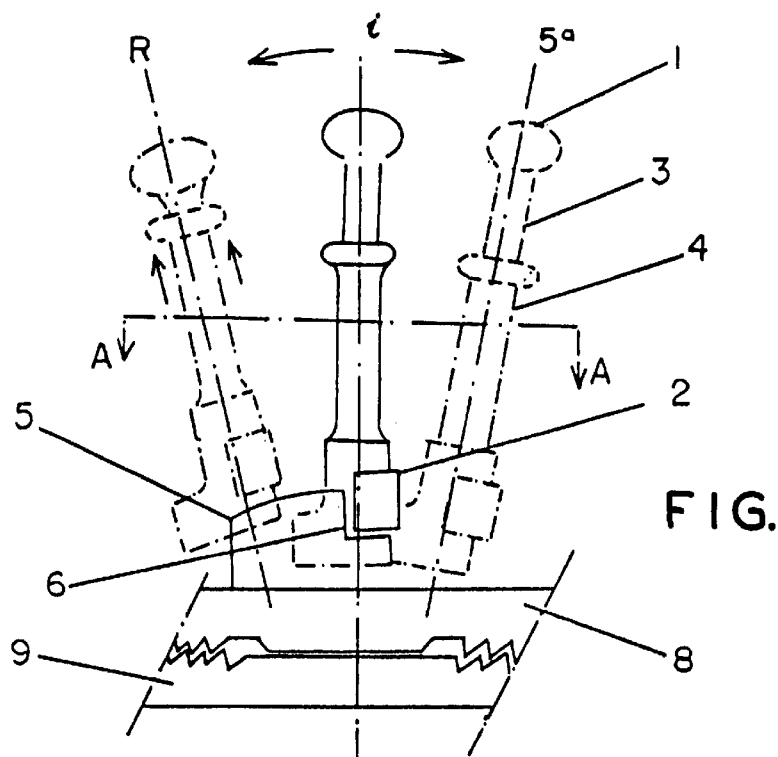
FIG. 4 is a partial side view of the gear control representing the longitudinal movement of the lever in the same lever of the fifth gear and of the reverse gear, showing the positions of the locking bar and of the lock of the reverse gear inhibitor in each speed.
Figure 5:
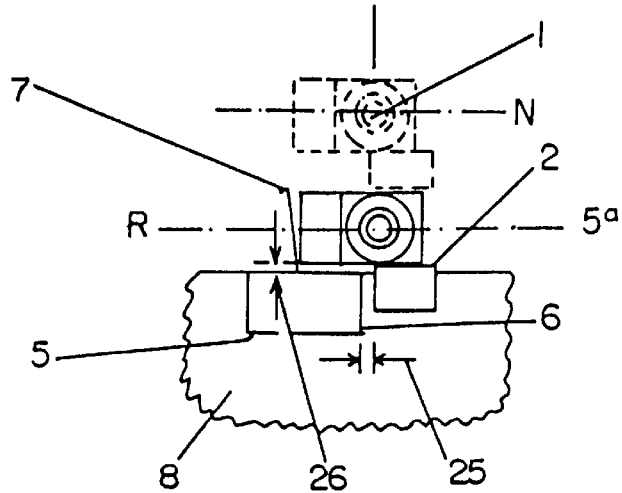
FIG. 5 is a partial upper view, as per cross section A—A of FIG. 4, of the lever, the locking bar and the inhibitor lock in the adjustment position and of the previously determined plays for each vehicle, which have to be adjusted in the adjustment of the locking position.

When unlocking transversely from the neutral into the $5^{th}$-R engaging plan, which is the plan represented in a lateral view of FIG. 4, and in the upper view of FIG. 5, the lever 1 meets the stop on the face 7 of the inhibitor lock 5 and from said position it may move freely forward to engage the $5^{th}$, gear, but is not allowed to move backwards to engage the reverse gear R due to the locking bar 2 which strikes the face 6 of the inhibitor lock 5.

When the driver wants to engage the reverse gear, he must unlock the inhibitor system raising the locking bar 2 by means of the upper projection of the operating pipe 4, in such a way that said locking bar passes freely above the inhibitor lock 5, and the lever 1 may move into the reverse gear position R, as shown in FIG. 4 attached hereto, shown in dotted line.

In the fast changes from the $5^{th}$ to the $4^{th}$ gear and vice-versa, which is a wavy movement, the inhibitor system shall allow the lever 1 to move in a given and free way, as in the other gears. For this purpose, it

What is claimed is:

1. Outside control of automobile transmission with inhibitor for preventing involuntary gearing of the reverse gear, comprising a control lever (1) connected through bars or cables (12) to a gear box, in order to establish the desired transmission rates through a combination of the gears of said box, a locking bar (23) which slides axially on the control lever (1), with said locking bar (2) having as a stop an inhibitor lock (5) which does not allow the engagement of the reverse gear when the locking bar (2) is not intentionally raised, and when raised clears the inhibitor lock (5) in order to allow the engagement of said gear, characterized by the fact that said inhibitor lock (5) is solidary with a movable base (8) which is supported on a fixed base (9), with said bases having means to move and lock the movable base on the fixed base, in such a way to allow the adjustment of the position of said inhibitor lock (5) in the longitudinal and transverse direction and the fixing of the position so established, in such a way to allow that the adjustment be made within a cabin of a vehicle.

2. Outside control of automobile transmission with inhibitor for preventing involuntary gearing of the reverse gear, as per the terms of claim 1, characterized by the fact that the relative position between the lock (5) and the locking bar (2) in the longitudinal direction and transverse direction is determined by the position of the fitting of the teeth of serrated portion (15) of the movable base (8) in respect to the tooth of the serrated portion (16) of the fixed base (9), a position which may be changed in the two directions, releasing the fixing means (19) which fix the movable base (8), raising said base sufficiently to clear the edges of the opposite teeth, displacing it longitudinally and transversely until the inhibitor lock (5) is at a given distance determined by the adjustment plays in respect to the locking bar (2); and by the fact that during the adjustment the fixing means (19) follow the movements of the movable base (8) sliding in the longitudinal oblong holes (23) and in a "T" shaped transverse openings (24), and are then tightened in the correct position of the inhibitor lock (5).

\* \* \* \* \*